US012632542B1

(12) United States Patent
Gu et al.

(10) Patent No.: US 12,632,542 B1
(45) Date of Patent: May 19, 2026

(54) SYSTEMS AND METHODS FOR DETECTING USER INCAPACITATED STATES FOR SECURING A MOBILE DEVICE AGAINST UNINTENDED USE

(71) Applicant: GEN DIGITAL INC., Tempe, AZ (US)

(72) Inventors: Lei Gu, Bedford, MA (US); Michael Shavell, Merrimack, NH (US)

(73) Assignee: Gen Digital, Inc., Tempe, AZ (US)

( * ) Notice: Subject to any disclaimer, the term of this patent is extended or adjusted under 35 U.S.C. 154(b) by 106 days.

(21) Appl. No.: 18/053,782

(22) Filed: Nov. 9, 2022

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | | |
|---|---|---|---|---|
| 9,846,999 | B1 * | 12/2017 | Pickover | H04M 1/72403 |
| 11,032,137 | B2 * | 6/2021 | Park | G06F 3/04842 |
| 11,161,409 | B1 * | 11/2021 | Ghannam | H04L 9/3239 |
| 11,441,916 | B1 * | 9/2022 | Konrardy | G01C 21/343 |
| 11,528,355 | B1 * | 12/2022 | Vadamalayan ... | H04M 1/72463 |
| 11,606,689 | B1 * | 3/2023 | Mhaske | H04W 12/068 |
| 2018/0040230 | A1 * | 2/2018 | Benoit | G08B 25/10 |

| | | | | |
|---|---|---|---|---|
| 2019/0101634 | A1 * | 4/2019 | Baheti | G01S 7/415 |
| 2019/0261152 | A1 * | 8/2019 | Weinfield | H04B 7/18504 |
| 2019/0312967 | A1 * | 10/2019 | Sheng | G06F 21/35 |
| 2020/0175782 | A1 * | 6/2020 | Tokman | G07C 5/085 |
| 2020/0237277 | A1 * | 7/2020 | Ouyang | A61B 5/18 |
| 2020/0285725 | A1 * | 9/2020 | Dong | G06F 3/04883 |
| 2021/0291650 | A1 * | 9/2021 | Minjeur | B60K 35/60 |
| 2022/0176978 | A1 * | 6/2022 | Bastide | B60R 16/037 |
| 2023/0373494 | A1 * | 11/2023 | Phelan | G07C 5/008 |
| 2023/0409054 | A1 * | 12/2023 | Bradley | G05D 1/106 |
| 2024/0043041 | A1 * | 2/2024 | Lopatine | B60W 60/0016 |
| 2024/0109661 | A1 * | 4/2024 | Holstine | B64D 25/10 |
| 2024/0314853 | A1 * | 9/2024 | Krishnan | H04W 48/18 |
| 2024/0396872 | A1 * | 11/2024 | Mitchell | H04L 63/1425 |

OTHER PUBLICATIONS

Michale Chung et al: "Wearable flexible sweat sensors for health-care monitoring: a review", J. R. Soc. Interface 16: Feb. 17, 2019, http://dx.doi.org/10.1098/rsif.2019.0217, 2019, pp. 1-15.

(Continued)

*Primary Examiner* — Gary S Gracia
(74) *Attorney, Agent, or Firm* — ALG Intellectual Property, LLC

(57) ABSTRACT

The disclosed computer-implemented method for detecting user incapacitated states for securing a mobile device against unintended use may include (i) monitoring sensor data generated for a current user of the mobile device, (ii) detecting, based on the sensor data, an incapacitated state associated with the current user, and (iii) performing a security action that protects against unintended use of the mobile device by disabling access to device functionality when the current user is in the incapacitated state. Various other methods, systems, and computer-readable media are also disclosed.

20 Claims, 7 Drawing Sheets

(56) References Cited

OTHER PUBLICATIONS

Zhong et al: "Wearable Sweat Loss Measuring Devices: From the Role of Sweat Loss to Advanced Mechanisms and Designs", Advanced Science, DOI: 10.1002/advs.202103257, 2021, pp. 1-27. 2021.

Alobaidi et al: "Real-world smartphone-based gait recognition", Computers & Security, https://doi.org/10.1016/j.cose.2021.102557, Elsevier Ltd., 2021, pp. 1-11.

Joel Snyder: "Using biometrics for authentication in Android", https://insights.samsung.com/2021/04/21/using-biometrics-for-authentication-in-android-2/, Apr. 21, 2021, pp. 1-3.

Emily Henderson: "Adapting smartwatches to deliver information about brain states", https://www.news-medical.net/news/20200413/Adapting-smartwatches-to-deliver-information-about-brain-states.aspx, Apr. 13, 2020, pp. 1-2.

Hsin-Liu (Cindy) Kao et al: "Phone based Gait Analysis to Detect Alcohol Usage", UbiComp'12, Sep. 5-8, 2012, Pittsburgh, USA, ACM 978-1-4503-1224-0/12/09, 2012, pp. 1-2.

* cited by examiner

200

300

SYSTEMS AND METHODS FOR DETECTING USER INCAPACITATED STATES FOR SECURING A MOBILE DEVICE AGAINST UNINTENDED USE

BACKGROUND

Mobile computing devices often provide users with various biometric authentication methods (e.g., fingerprint scanning, facial recognition, iris/retina recognition, etc.) for performing device locking and unlocking functionality, accessing financial accounts (e.g., for authorizing payments) and installing applications, thereby preventing unauthorized access. The aforementioned authentication methods, however, are only effective as security measures when the user is not in an incapacitated state. For example, a user under intoxication or experiencing a health emergency involving a loss of motor skills or consciousness may often fall victim to malicious actors who may unlock the user's device utilizing the incapacitated user's biometrics and take full device control including accessing various payment methods linked to user financial accounts.

SUMMARY

As will be described in greater detail below, the present disclosure describes various systems and methods for detecting user incapacitated states for securing a mobile device against unintended use.

In one example, a method for detecting user incapacitated states for securing a mobile device against unintended use may include (i) monitoring, by one or more computing devices, sensor data generated for a current user of the mobile device, (ii) detecting, by the one or more computing devices and based on the sensor data, an incapacitated state associated with the current user, and (iii) performing, by the one or more computing devices, a security action that protects against unintended use of the mobile device by disabling access to device functionality when the current user is in the incapacitated state.

In some examples, the method may further include (i) determining a termination of the incapacitated state and (ii) restoring the access to the device functionality. In some examples, the sensor data may be monitored by receiving biometric data associated with the current user from one or more mobile device sensors. Additionally or alternatively, the sensor data may be monitored by receiving motion data associated with the current user from one or more mobile device sensors.

In some examples, the incapacitated state may be detected by analyzing the sensor data to identify an impaired physical condition. Additionally or alternatively, the incapacitated state may be detected by analyzing the sensor data to identify an impaired mental condition.

In some examples, the security action may include disabling a biometric method for unlocking the mobile device from a locked state. Additionally or alternatively, the security action may include disabling a wireless communication method on the mobile device. Additionally or alternatively, the security action may include disabling access to financial account information associated with the current user. Additionally or alternatively, the security action may include generating an alert including a notification of the incapacitated state for a designated party associated with the current user.

In one embodiment, a system for detecting user incapacitated states for securing a mobile device against unintended use may include at least one physical processor and physical memory that includes a set of modules and computer-executable instructions that, when executed by the physical processor, cause the physical processor to (i) monitor, by a sensor module, sensor data generated for a current user of the mobile device, (ii) detect, by a detection module and based on the sensor data, an incapacitated state associated with the current user, and (iii) perform, by a security module, a security action that protects against unintended use of the mobile device by disabling access to device functionality when the current user is in the incapacitated state.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor sensor data generated for a current user of the computing device, (ii) detect, based on the sensor data, an incapacitated state associated with the current user, and (iii) perform a security action that protects against unintended use of the computing device by disabling access to device functionality when the current user is in the incapacitated state.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
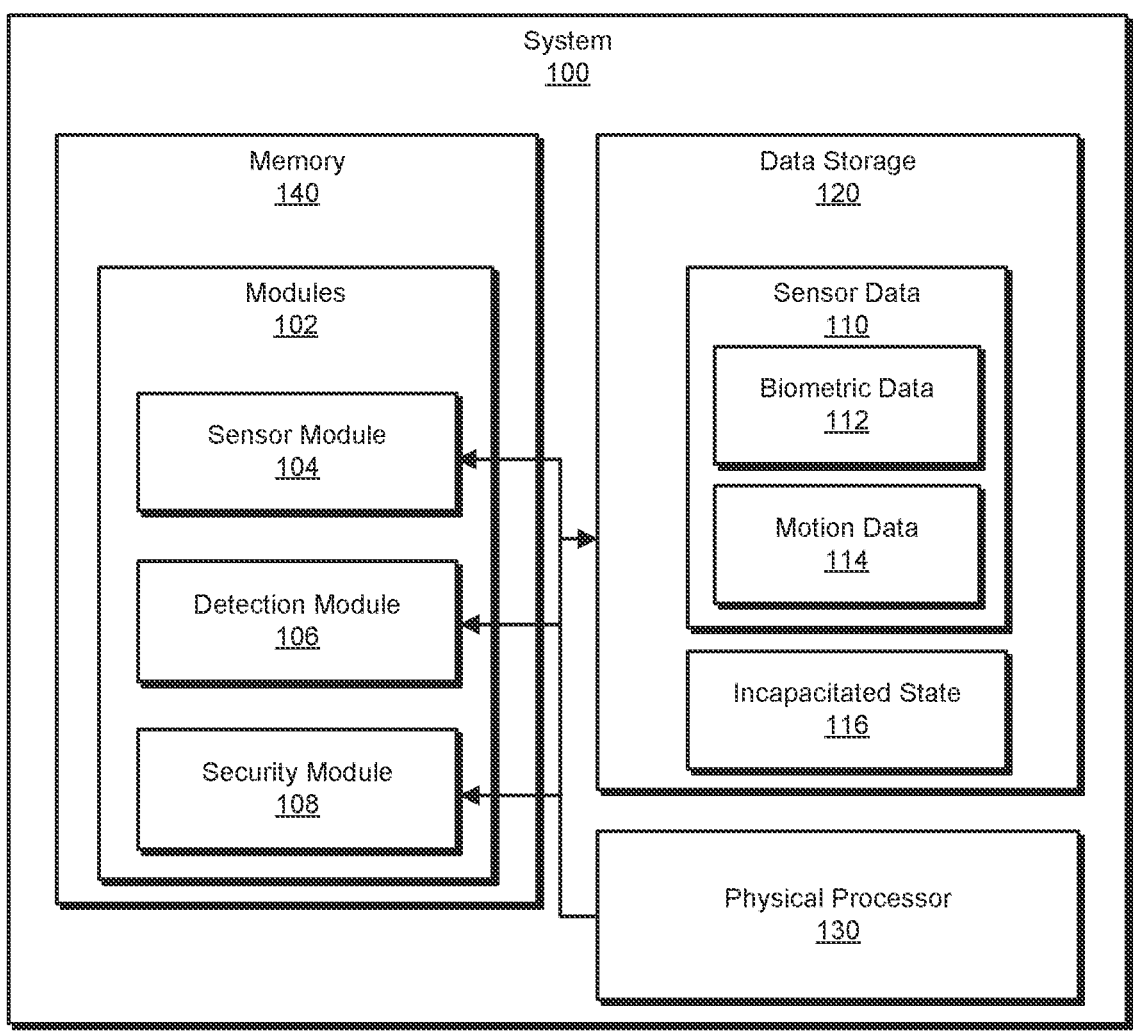
FIG. 1 is a block diagram of an example system for detecting user incapacitated states for securing a mobile device against unintended use.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting user incapacitated states for securing a mobile device against unintended use. As will be described in greater detail below, the systems and methods described herein may utilize biometric and motion sensor data collected by mobile devices (including devices utilizing wearable technology) to detect user physical and mental incapacitated states caused by, for example, medical emergencies, intoxication, injuries, etc. By utilizing the sensor data in this way, the systems and methods described herein may prevent unauthorized access to user mobile devices in a variety of contexts. For example, upon detecting that a user is in an incapacitated state, the systems and methods described herein my disable a mobile device's biometric authentication/unlocking functionality, thereby preventing malicious or other unauthorized parties from utilizing the user's physical characteristics (e.g., fingerprints, iris/retina, facial features, etc.) to unlock their device. Additionally, the systems and methods described herein may further disable mobile device wireless communication features and further (e.g., by leveraging an identity theft protection application), disable access to user financial accounts. Then, upon receiving a confirmation that the user is no longer in an incapacitated state, the systems and methods described herein may then restore the disabled functionality back to the mobile device. In addition, the systems and methods described herein may improve the fields of computing device security and data privacy by protecting against phishing attacks (e.g., identify theft) and malware attacks (e.g., the installation of malicious applications on mobile devices, resulting from the unauthorized access and use of mobile devices by malicious actors.

Figure 2:
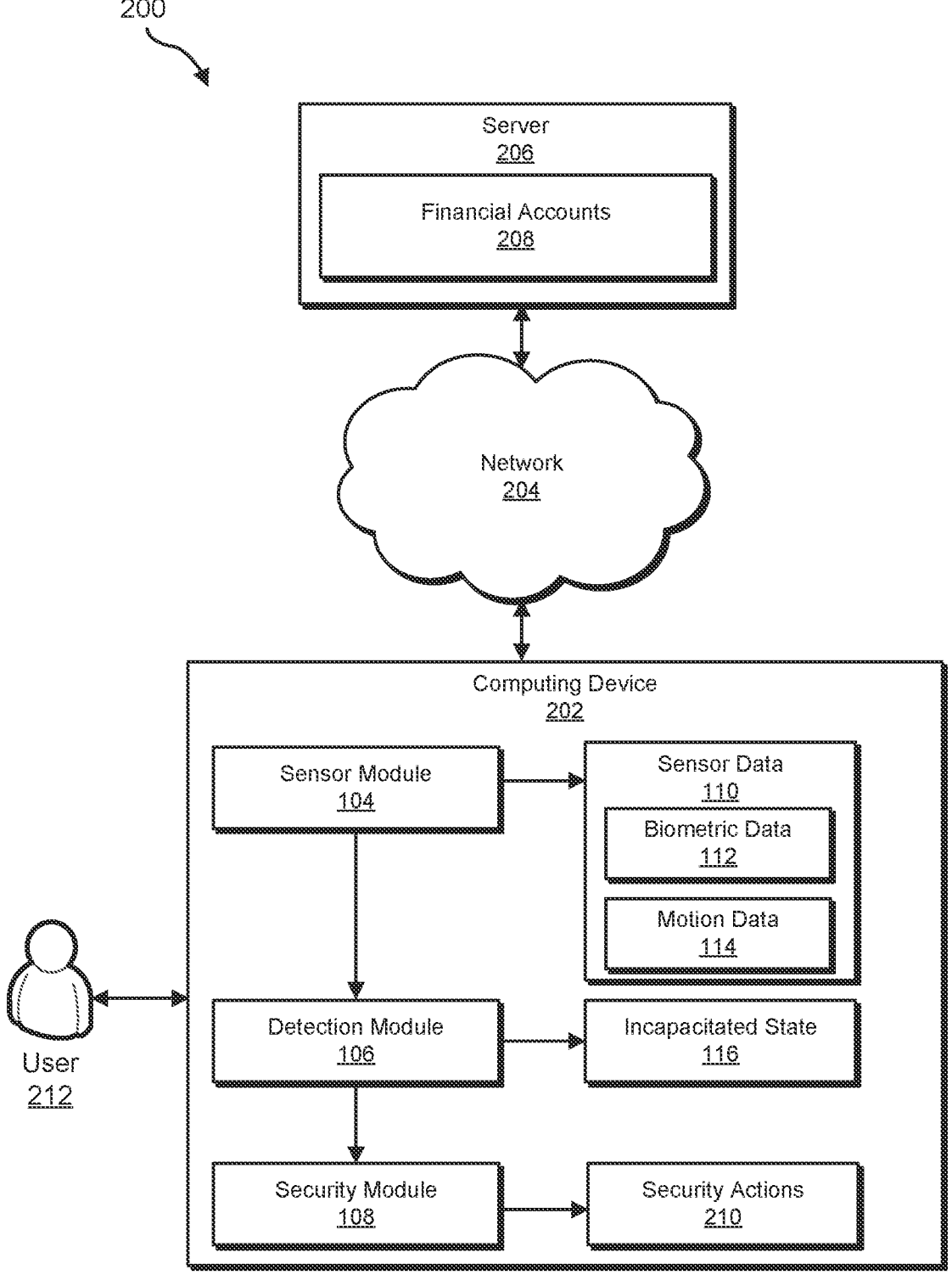
FIG. 2 is a block diagram of an additional example system for detecting user incapacitated states for securing a mobile device against unintended use.

The following will provide, with reference to FIGS. 1-2, detailed descriptions of example systems for detecting user incapacitated states for securing a mobile device against unintended use. Detailed descriptions of corresponding computer-implemented methods will also be provided in connection with FIG. 3. In addition, detailed description so example security actions that may be implemented by the example systems of FIGS. 1 and 2 will also be provided in connection with FIGS. 5-6. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting user incapacitated states for securing a mobile device against unintended use. As illustrated in this figure, example system 100 may include one or more modules 102 for performing one or more tasks. For example, and as will be explained in greater detail below, example system 100 may include a sensor module 104 that monitors sensor data 110 (i.e., biometric data 112 and/or motion data 114) generated for a current user of a mobile device. Example system 100 may additionally include a detection module 106 that, based on sensor data 110, detects an incapacitated state associated with the current user. Example system 100 may also include a security module 108 that performs a security action that protects against unintended use of the mobile device by disabling access to device functionality when the current user is in incapacitated state 116. Although illustrated as separate elements, one or more of modules 102 in FIG. 1 may represent portions of a single module or application.

The term "incapacitated state," as used herein, generally refers to any of a number of unexpected or sudden mental or physical distress states that may prevent a user from performing active or passive activities associated with a mobile device that may be currently in their possession (e.g., locking/unlocking, reading, typing, capturing photographs, viewing video streams, engaging with mobile applications and data (including financial accounts), etc.). For example, mental distress states (i.e., mental incapacitation) may include, without limitation, seizures, strokes, heart attacks, or alcohol or drug inducted intoxication. Similarly, physical distress states may include, without limitation, vehicular, maritime or aviation accidents, falling events (e.g., concussions), or physical altercations.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting user incapacitated states for securing a mobile device against unintended use. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store sensor data 110 (including biometric data 112 and motion data 114) and data corresponding to incapacitated state 116

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect user incapacitated states for securing a mobile device against unintended use.

For example, sensor module 104 may monitor sensor data 110 (e.g., biometric data 112 and/or motion data 114) for a user 212 of a mobile device (i.e., computing device 202). Next, detection module 106 may detect, based on sensor data 110, incapacitated state 116 associated with user 212. Finally, security module 108 may perform security actions 210 that protect against unintended use of the mobile device by disabling access to device functionality (e.g., disabling access to financial accounts 208) when user 212 is in incapacitated state 116.

Computing device 202 generally represents any type or form of computing device capable of reading computer-executable instructions. In some examples, computing device 202 may be a mobile computing device (e.g., a smartphone or a wearable device such as a smart watch, smart glasses, etc.) running client-side security and/or theft protection software. Additional examples of computing device 202 include, without limitation, laptops, tablets, desktops, servers, cellular phones, Personal Digital Assistants (PDAs), multimedia players, embedded systems, smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In some examples, server 206 may be an application server for providing various services for mobile devices (such as providing access to financial accounts). Additional examples of server 206 include, without limitation, security servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
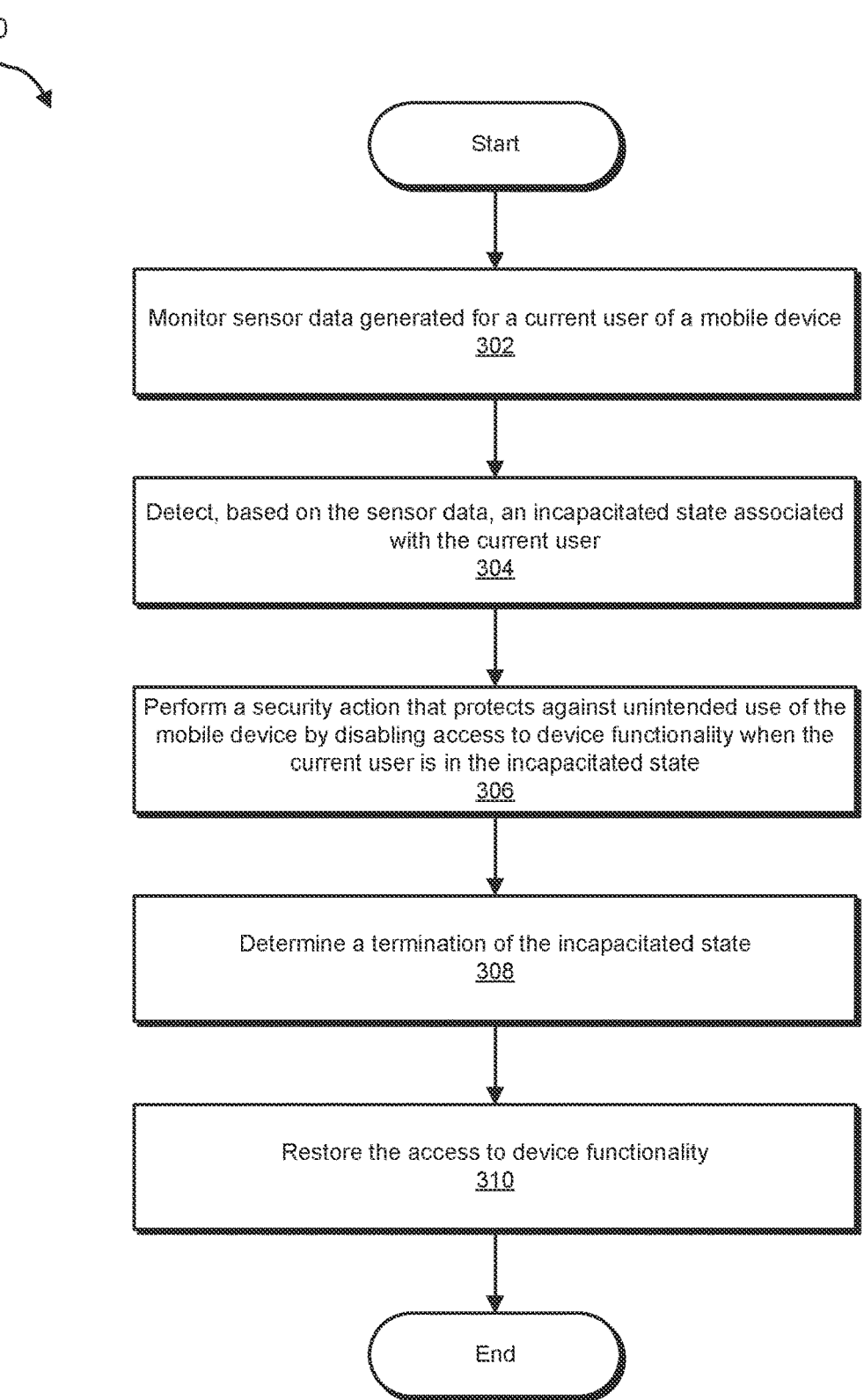
FIG. 3 is a flow diagram of an example method for detecting user incapacitated states for securing a mobile device against unintended use.

FIG. 3 is a flow diagram of an example computer-implemented method 300 for detecting user incapacitated states for securing a mobile device against unintended use.

The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may monitor sensor data generated for a current user of a mobile device. For example, sensor module 104 may, as part of computing device 202 in FIG. 2, monitor sensor data 110 generated for user 212. In some examples, sensor data 110 may include data collected from any number of mobile device sensors that may be integrated or in communication with computing device 202 including biometric sensors and motion sensors (e.g., accelerometers, gyroscopes, microphones, etc.).

Sensor module 104 may monitor sensor data 110 in a variety of ways. In some examples, sensor module 104 may receive biometric data 112 associated with user 212 (e.g., sweat response, respiration, cardiac function, and temperature) from biometric sensors and motion data 114 associated with user 212 (e.g., gait tracking/analysis, movement or lack of movement, slips and falls, etc.) from motion sensors.

At step 304, one or more of the systems described herein may detect, based on the monitoring of sensor data at step 302, an incapacitated state associated with the current user. For example, detection module 106 may, as part of computing device 202 in FIG. 2, detect incapacitated state 116 for user 212 based on sensor data 110.

Detection module 106 may detect incapacitated state 116 in a variety of ways. In some examples, detection module 106 may analyze sensor data 110 to identify an impaired physical condition. For example, detection module 106 may analyze motion data 114 received from accelerometer, gyroscope, and microphone sensors to detect vehicular and bike accidents, collisions, slips and falls, or physical altercations. Additionally or alternatively, detection module 106 may analyze motion data 114 received from gait tracking/analysis sensors to detect physical impairment due to intoxication (e.g., excessive drug or alcohol use). In other examples, detection module 106 may analyze sensor data 110 to identify an impaired mental condition. For example, detection module 106 may analyze biometric data 112 received from biometric sensors to detect an incapacitated mental state due to lack of movement, changes in sweat response, cardiac function, and temperature.

At step 306, one or more of the systems described herein perform a security action that protects against unintended use of the mobile device by disabling access to device functionality when the current user is in the incapacitated state. For example, security module 108 may, as part of computing device 202 in FIG. 2, perform one or more of security actions 210 that protect against unintended use of computing device 2 by disabling access to device functionality when user 212 is in incapacitated state 116.

Security module 108 may perform security actions 210 in a variety of ways. In some examples, security module 108 may disable a biometric method for unlocking computing device 202 from a locked state. For example, security module 108 may disable biometric device unlock functions utilized by computing device 202 such as fingerprint, facial, and or retina/iris recognition. Additionally or alternatively, security module 108 may disable a wireless communication method utilized by computing device 202 such as BLU-ETOOTH short-range wireless technology signals or near field communication (NFC) signals. Additionally or alternatively, security module 108 may disable access to information from financial accounts 208 associated with user 212. In some examples, security module 108 may disable access to information from financial accounts 208 by locking down (i.e., restricting access) to financial accounts 208 (e.g., checking accounts, savings accounts, cryptocurrency wallets, etc.) when user 212 is incapacitated state 116. In other examples, security module 108 may disable access to information from financial accounts 208 by disabling the ability to create new financial accounts and disabling (i.e., pausing) financial account spending (e.g., from credit cards). In these examples, the disabling of access to information to financial accounts 208 may be initiated either directly by security module 108 or by initiating an application programming interface (API) to an identity theft protection application associated with financial accounts 208 for user 212. In yet other examples, security module 108 may generate an alert (e.g., a text or e-mail message) notifying a designated party (e.g., an emergency contact) of incapacitated state 116 associated with user 212.

At step 308, one or more of the systems described herein determine a termination of the incapacitated state. For example, security module 108 may, as part of computing device 202 in FIG. 2, identify a termination of incapacitated state 116 based on updated sensor data, monitored by sensor module 104 and analyzed by detection module 106, indicating that biometric data 112 and/or motion data 114 has returned to normal or baseline values (e.g., updated biometric sensor data may indicate normal levels of movement, sweat response, respiration, cardiac function, and temperature corresponding to a range of previously determined baseline values for user 212 and updated motion sensor data may indicate normal gait levels, non-accident or fall conditions, etc.) As another example, security module 108 may, as part of computing device 202 in FIG. 2, identify a termination of incapacitated state 116 based on identifying a manual entry of a device passcode code (e.g., from user 212) that unlocks computing device 202.

At step 310, one or more of the systems described herein restore access to device functionality. For example, security module 108 may, as part of computing device 202 in FIG. 2, enable previously disabled biometric and wireless communication methods as well as restore access to financial accounts 208.

Figure 4:
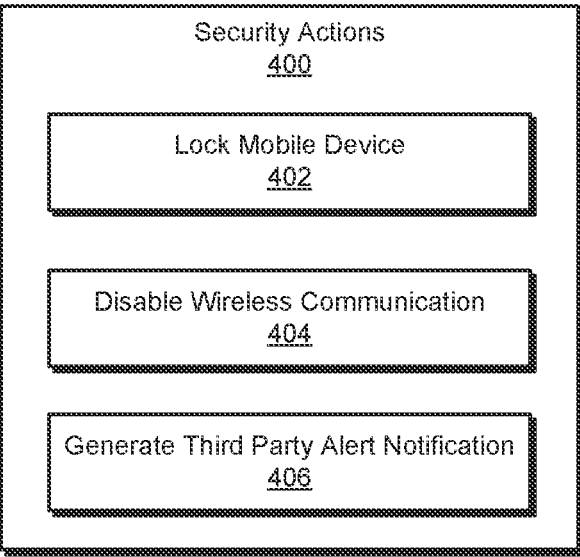
FIG. 4 is a block diagram of example security actions that may be implemented by the example systems of FIGS. 1 and 2.

FIG. 4 is a block diagram of example security actions 400 that may be performed in response to detecting user incapacitated states. As illustrated in FIG. 4 (and as described above in the description of FIG. 3, security actions 400 may include lock mobile device 402, disable wireless communication 404, and generate third party alert notification 406.

Figure 5:
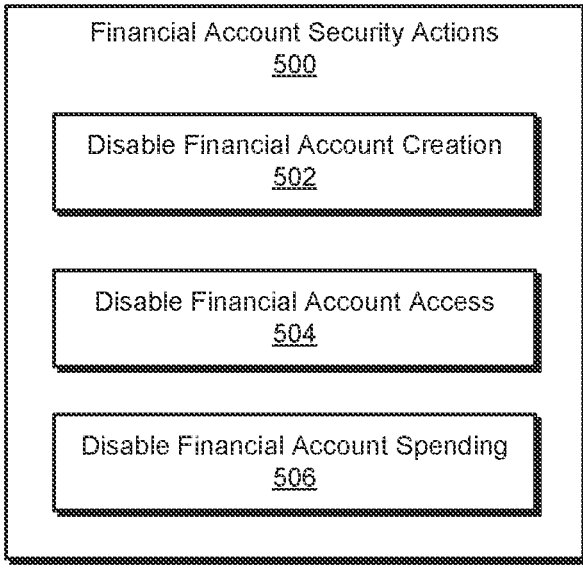
FIG. 5 is a block diagram of additional example security actions that may be implemented by the example systems of FIGS. 1 and 2.

FIG. 5 is a block diagram of example financial account security actions 500 that may be performed in response to detecting user incapacitated states. As illustrated in FIG. 5 (and as described above in the description of FIG. 3, financial account security actions 500 may include disable financial account creation 502, disable financial account access 504, and disable financial account spending 506.

As explained in connection with method 300 above, the systems and methods described herein provide for detecting user incapacitated states for securing a mobile device against unintended use. The systems and methods described herein may utilize biometric and motion sensor data collected by mobile devices (including devices utilizing wearable technology) to detect user physical and mental incapacitated states caused by, for example, medical emergencies, intoxication, injuries, etc. By utilizing the sensor data in this way, the systems and methods described herein may prevent unauthorized access to user mobile devices in a variety of contexts. For example, upon detecting that a user is in an incapacitated state, the systems and methods described herein my disable a mobile device's biometric authentication/unlocking functionality, thereby preventing malicious or other unauthorized parties from utilizing the user's physical characteristics (e.g., fingerprints, iris/retina, facial features, etc.) to unlock their device. Additionally, the systems and methods described herein may further disable mobile device wireless communication features and further (e.g., by leveraging an identity theft protection application), disable access to user financial accounts. Then, upon receiving a confirmation that the user is no longer in an incapacitated state, the systems and methods described herein may then restore the disabled functionality back to the mobile device.

Figure 6:
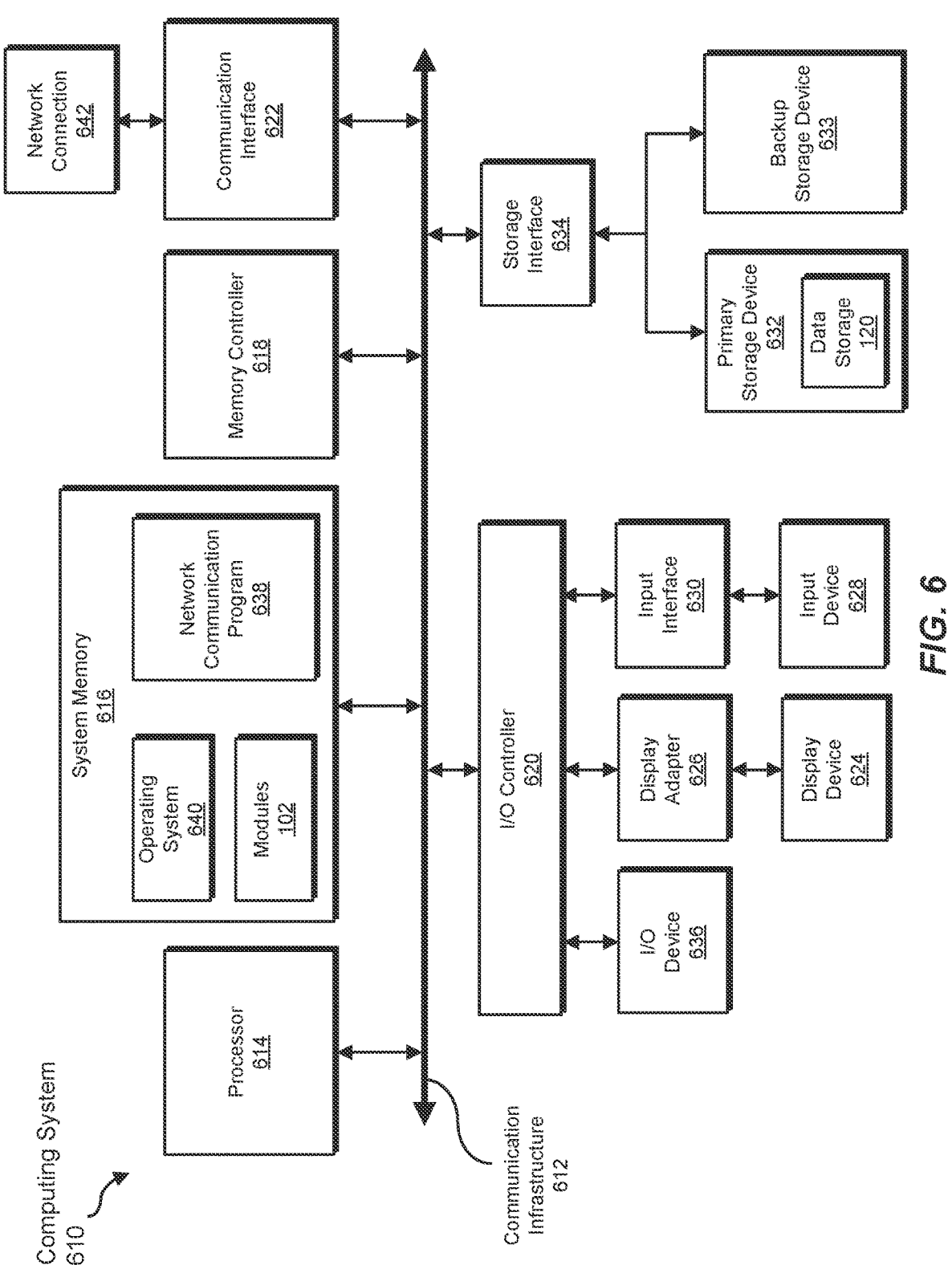
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
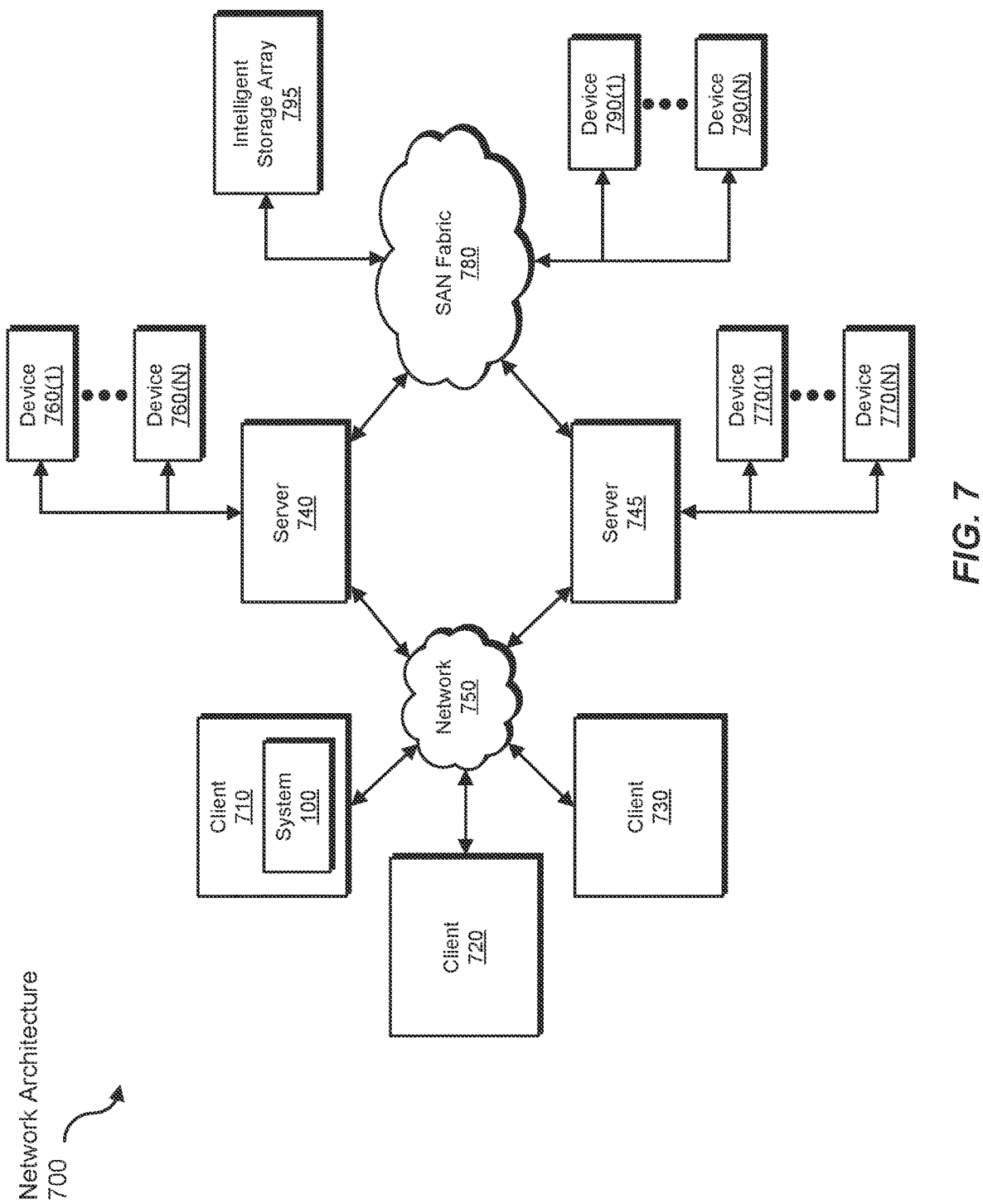
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture

700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting user incapacitated states for securing a mobile device against unintended use.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting user incapacitated states for securing a mobile device against unintended use, at least a portion of the method being performed by at least one processor, the method comprising:

monitoring, by a sensor module of the mobile device, sensor data generated for a current user of the mobile device;

detecting, by the mobile device and based on the sensor data, an incapacitated state associated with the current user;

performing, by the mobile device, a security action that protects against unintended use of the mobile device by disabling device functionality of the mobile device when the current user is in the incapacitated state, wherein disabling the device functionality includes disabling a biometric method for unlocking the mobile device from a locked state, disabling access to financial account information associated with the current user, and disabling a wireless communication of the mobile device;

determining, by the mobile device, a termination of the incapacitated state based on updated sensor data monitored by the sensor module that indicates that the updated sensor data has returned to baseline values; and restoring, by the mobile device, the device functionality of the mobile device in response to determining the termination of the incapacitated state by reenabling the previously disabled biometric method, the previously disabled access to the financial account information, and the previously disabled wireless communication.

2. The computer-implemented method of claim 1, wherein monitoring the sensor data comprises receiving biometric data associated with the current user from one or more mobile device sensors.

3. The computer-implemented method of claim 1, wherein monitoring the sensor data comprises receiving motion data associated with the current user from one or more mobile device sensors.

4. The computer-implemented method of claim 1, wherein detecting, based on the sensor data, the incapacitated state associated with the current user comprises analyzing the sensor data to identify an impaired physical condition.

5. The computer-implemented method of claim 1, wherein detecting, based on the sensor data, the incapacitated state associated with the current user comprises analyzing the sensor data to identify an impaired mental condition.

6. The computer-implemented method of claim 1, wherein performing the security action comprises generating an alert comprising a notification of the incapacitated state for a designated party associated with the current user.

7. The method of claim 1, wherein determining the termination of the incapacitated state is based on at least one of updated sensor data and identifying a manual entry of a device passcode.

8. The method of claim 1, wherein disabling access to the financial account information associated with the current user further comprises at least one of:

disabling financial account creation;

disabling financial account access; or disabling financial account spending.

9. A system for detecting user incapacitated states for securing a mobile device against unintended use, the system comprising:

at least one physical processor; and physical memory comprising computer-executable instructions and one or more modules that, when executed by the physical processor, cause the physical processor to:

monitor, by a sensor module of the mobile device, sensor data generated for a current user of the mobile device;

detect, by a detection module of the mobile device and based on the sensor data, an incapacitated state associated with the current user;

perform, by a security module of the mobile device, a security action that protects against unintended use of the mobile device by disabling device functionality of the mobile device when the current user is in the incapacitated state, wherein disabling the device functionality includes disabling a biometric method for unlocking the mobile device from a locked state, disabling access to financial account information associated with the current user, and disabling a wireless communication of the mobile device;

determine, by the security module, a termination of the incapacitated state based on updated sensor data monitored by the sensor module that indicates that the updated sensor data has returned to baseline values; and restore, by the security module, the device functionality of the mobile device in response to determining the termination of the incapacitated state by reenabling the previously disabled biometric method, the previously disabled access to the financial account information, and the previously disabled wireless communication.

10. The system of claim 9, wherein the sensor module monitors the sensor data by receiving biometric data associated with the current user from one or more mobile device sensors.

11. The system of claim 9, wherein the sensor module monitors the sensor data by receiving motion data associated with the current user from one or more mobile device sensors.

12. The system of claim 9, wherein the detection module detects, based on the sensor data, the incapacitated state associated with the current user by analyzing the sensor data to identify an impaired physical condition.

13. The system of claim 9, wherein the detection module detects, based on the sensor data, the incapacitated state associated with the current user by analyzing the sensor data to identify an impaired mental condition.

14. The system of claim 9, wherein the security module determines the termination of the incapacitated state based on at least one of updated sensor data and identifying a manual entry of a device passcode.

15. The system of claim 9, wherein disabling access to the financial account information associated with the current user further comprises at least one of:

disabling financial account creation;

disabling financial account access; or disabling financial account spending.

16. A non-transitory computer-readable medium comprising one or more computer-executable instructions that, when executed by at least one processor of a computing device, cause the computing device to:

monitor, using a sensor module of the computing device, sensor data generated for a current user of the computing device;

detect, by the computing device based on the sensor data, an incapacitated state associated with the current user;

perform, by the computing device, a security action that protects against unintended use of the computing device by disabling device functionality of the computing device when the current user is in the incapacitated state, wherein disabling the device functionality includes disabling a biometric method for unlocking the computing device from a locked state, disabling access to financial account information associated with the current user, and disabling a wireless communication of the computing device;

determine, by the computing device, a termination of the incapacitated state based on updated sensor data monitored by the sensor module that indicates that the updated sensor data has returned to baseline values; and restore, by the computing device, the device functionality of the computing device in response to determining the termination of the incapacitated state by reenabling the previously disabled biometric method, the previously disabled access to the financial account information, and the previously disabled wireless communication.

17. The non-transitory computer-readable medium of claim 16, wherein monitoring the sensor data comprises receiving biometric data associated with the current user from one or more mobile device sensors.

18. The non-transitory computer-readable medium of claim 16, wherein performing the security action comprises generating an alert comprising a notification of the incapacitated state for a designated party associated with the current user.

19. The non-transitory computer-readable medium of claim 16, wherein determining the termination of the incapacitated state is based on at least one of updated sensor data and identifying a manual entry of a device passcode.

20. The non-transitory computer-readable medium of claim 16, wherein disabling access to the financial account information associated with the current user further comprises at least one of:

disabling financial account creation;

disabling financial account access; or disabling financial account spending.

* * * * *